(No Model.)

C. H. POST.
THILL COUPLING.

No. 328,430. Patented Oct. 13, 1885.

Witnesses:
Henry Bossert.
James T. Tobins

Inventor
Charles H. Post.
by his Attorneys.

UNITED STATES PATENT OFFICE.

CHARLES H. POST, OF PHILADELPHIA, PENNSYLVANIA.

THILL-COUPLING.

SPECIFICATION forming part of Letters Patent No. 328,430, dated October 13, 1885.

Application filed February 9, 1885. Serial No. 155,367. (No model.)

*To all whom it may concern:*

Be it known that I, CHARLES H. POST, a citizen of the United States, and a resident of Philadelphia, Pennsylvania, have invented certain Improvements in Thill-Couplings, of which the following is a specification.

The object of my invention is to so construct a thill-coupling that the rattling of the thills will be prevented, no material alteration of the usual thill-coupling being required in carrying out my invention.

Figure 1:
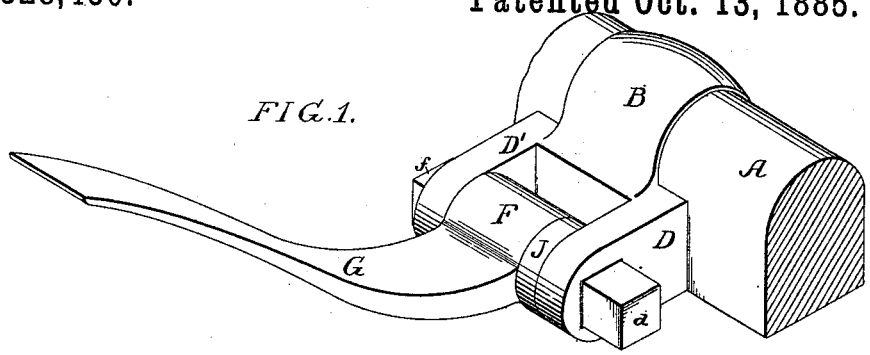
Figure 2:
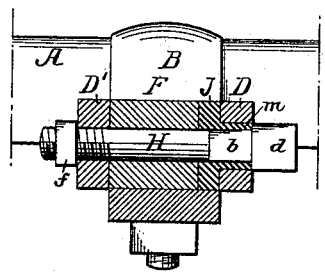
Figure 3:
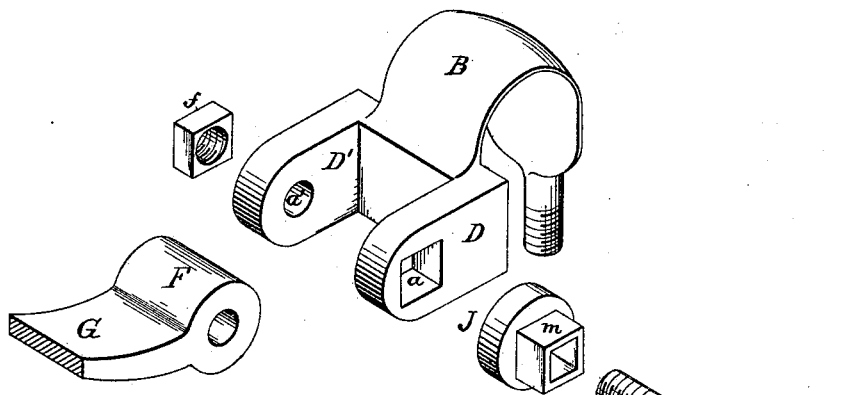

In the accompanying drawings, Figure 1 is a perspective view of sufficient of a thill-coupling to illustrate my invention; Fig. 2, a transverse section of the same, and Fig. 3 a perspective view showing the parts of the coupling detached from each other.

A represents part of the axle of a vehicle, and B the usual clip thereon, having projecting ears D D', to which the eye F of the thill-iron G is hung by the bolt H. The ordinary thill-coupling comprises these parts, the bolt passing through the eye and through openings $a$ $a'$ in the ears D D', the opening $a$ being squared for the reception of the squared portion $b$ of the bolt, the head $d$ of which bears against the outer side of the ear D, while the opposite threaded end of the bolt receives a nut, $f$, bearing against the opposite ear, D'.

My invention consists in the use, in connection with a coupling of this character, of a sleeve or washer, J, interposed between one end of the eye F and one of the ears D D', and having a projection, $m$, adapted to the opening in the said ear, which opening is made somewhat larger than usual for the reception of said projection. In the present instance the washer J is interposed between the eye F and the ear D, the projection $m$ being square for adaptation to the square opening $a$ of said ear. The projection $m$ is preferably as large as or somewhat larger than the head $d$ of the bolt, so that the bearing of the latter is wholly upon the end of the projection; hence, when the nut $f$ is tightened the pull upon the bolt is transmitted to the sleeve or washer J, and the latter is caused to bear firmly upon the end of the eye F of the thill-iron, and prevent any lateral play of the latter which might cause rattling, a partial turn of the nut, $f$, at intervals, being all that is necessary in order to compensate for the loss due to wear.

If desired, the projection $m$ may extend beyond the outer face of the ear, in which case the said projection need not be as large as the head of the bolt. The construction shown, however, is preferred on account of neatness.

One of the main advantages of my invention is its simplicity and consequent cheapness, the washer J being the only extra part used, and the ordinary coupling being adapted for the use of this washer by simply enlarging the usual opening in the ear.

If desired, the usual square opening may be simply bored out and the washer J may have a cylindrical projection, but the use of the square projection is preferred, as it prevents the washer from turning and thus overcomes all wear on the projection.

It will be evident that the washer might be used in connection with the ear D' and nut $f$, if desired, with the same result as that above set forth.

I claim as my invention—

1. The combination of the thill-iron and its eye, the attachment or clip having opposite ears, D D', the bolt H, forming the pivot-pin for the thill-eye, and the laterally adjustable washer J, bearing on one end of the thill-eye, the opposite end of which has a fixed bearing, as set forth.

2. The combination of the thill-iron and its eye, the attachment or clip having opposite ears, D D', the bolt H, forming the pivot-pin for the thill-eye, and the laterally-adjustable washer J, incapable of turning but having a bearing on one end of the thill-eye, the opposite end of which has a fixed bearing, as set forth.

3. The combination of the thill-iron and its eye, the attachment or clip having ears D D', the bolt H, serving as a pivot for the thill-eye, and the laterally-adjustable washer J, bearing on the end of the thill-eye and having a portion projecting through one of the ears D D', so as to form a bearing for the head or nut of the bolt H, as set forth.

In testimony whereof I have signed my name to this specification in the presence of two subscribing witnesses.

CHARLES H. POST.

Witnesses:
  HENRY BOSSERT,
  HARRY SMITH.